3,016,253
Patented Jan. 9, 1962

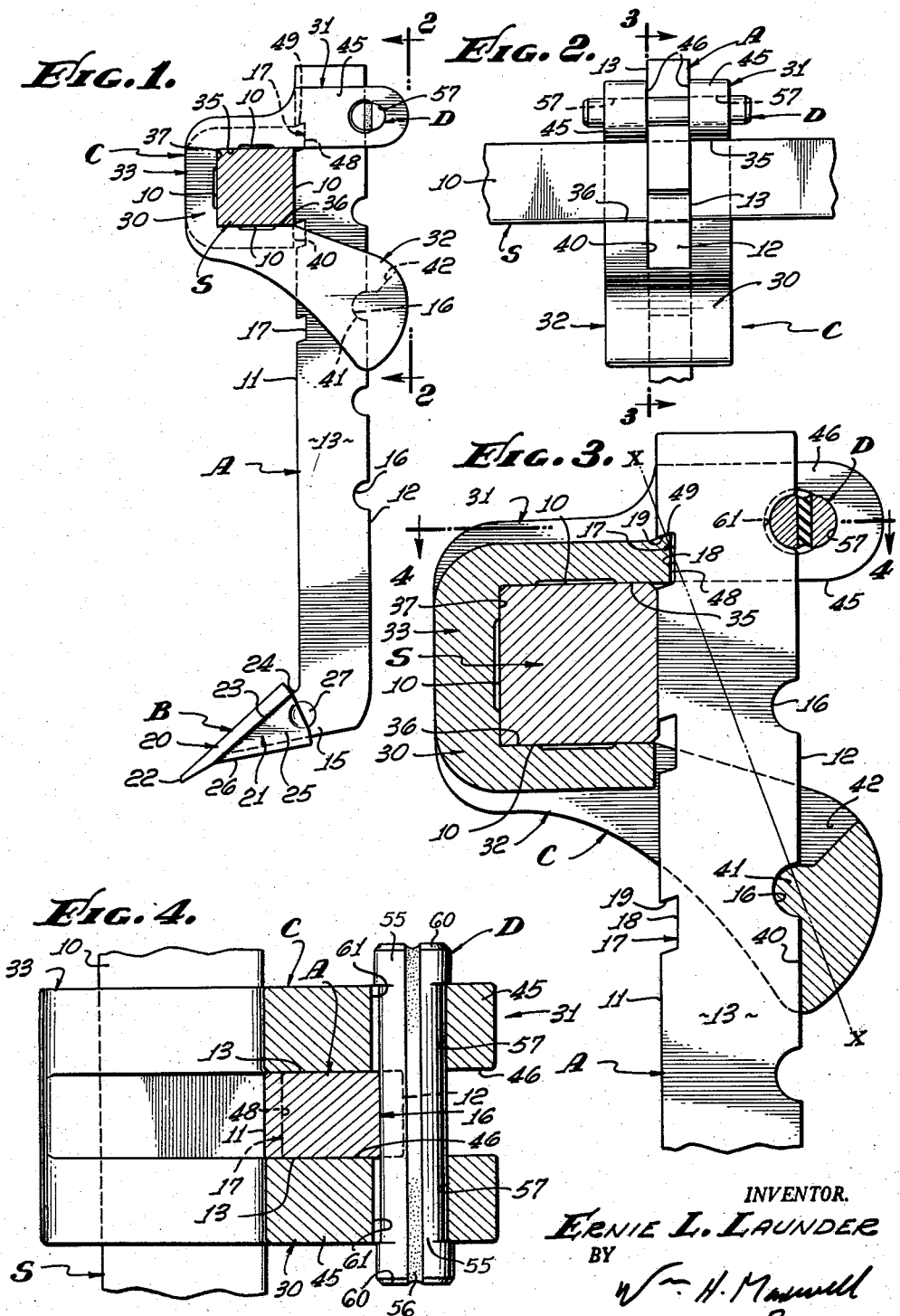

3,016,253
ADJUSTABLE TOOTH SHANK CONNECTION
Ernie Lloyd Launder, Montebello, Calif., assignor to H. & L. Tooth Company, Montebello, Calif., a corporation of California
Filed Dec. 31, 1956, Ser. No. 631,950
6 Claims. (Cl. 287—54)

This invention relates to an adjustable shank connection and in particular it relates to a tooth shank and supporting bar connection, it being a general object of this invention to provide means whereby a tooth shank is easily and quickly applied to or removed from and adjusted relative to a supporting bar, or the like.

Means have been devised heretofore and employed to connect arm shaped elements to bars or shafts. For example, a U-bolt may be employed that extends around the bar or shaft, the arm being drawn into tight engagement with the bar or shaft by nuts threaded onto the ends of the U-bolt. There are also other ways to connect said parts, but for the most part they are characterized by threaded connections that are slow and tedious to make and break, and they are not quickly and easily adjustable. Further, such connections are usually rigid in nature and are not adapted to withstand shock loads.

It is an object of this invention to provide means that connects an arm to a shaft like member to have driving connection therewith. As shown in the drawings, the said shaft like member is polygonal in cross section and there is provided a coupler element and a retaining pin that secures the said element in working position with the said member and arm in driving connection with each other.

It is also an object of this invention to provide an adjustable means that connects an arm to a shaft like member for the purpose above referred to. As shown, the said arm may be shifted and adjustably secured in various working positions relative to the shaft like member, as circumstances require.

It is still another object of this invention to provide a connection of the character referred to that is adapted to withstand shock loads and stresses while it maintains a positive drive connection between the arm and shaft like member.

It is also another object of this invention to provide a connection of the character referred to that involves but a minimum of simple easily manipulated elements and which provides a reliable and effective connection between the two major elements involved. The structure that I provide is not only simple, but it is inexpensive of manufacture, and it is easily assembled and put into operating condition.

The various objects and features of my invention will be fully understood from the following detailed description of a typical preferred form and application of my invention, throughout which description reference is made to the accompanying drawings in which:

FIG. 1 is a side view of the connection provided by the present invention and showing the shaft or bar like member in section. FIG. 2 is a back view taken as indicated by lines 2—2 on FIG. 1. FIG. 3 is an enlarged detailed sectional view taken as indicated by lines 3—3 on FIG. 2, and FIG. 4 is a plan section taken as indicated by lines 4—4 on FIG. 3.

The structure of the present invention is adapted to be used in the construction of earth handling equipment and machinery and it is particularly adapted to be used in connecting a tooth shank to a supporting bar or shaft. Scarifier teeth, brush grubbing teeth, and the like, used on power driven vehicles are carried on arm like elements or shanks. In some equipment of this type it is desired to rotatably support the shank or arm like element so that it swings, the tooth point being at the terminal end of the shank laterally displaced from the axis of a supporting shaft. It is also desired, in many cases, to employ a plurality of shanks and tooth points that swing or operate in unison, in which case a polygonal shaft S is employed, as shown. In this latter case it is necessary to have a driving connection between the shanks and the shaft so that said shanks will operate and swing together. Further, adjustment is often required in order to properly space the tooth point from the axis of the shaft, as required under different working conditions.

The adjustable tooth shank connection of the present invention is employed on earth digging equipment or the like and involves, generally, an arm like shank A, a tooth point B carried at the terminal end of the shank A, a coupler C engaged with the shaft S to connect said shank to the shaft, and a pin D engaged with the coupler C and shank A to hold the coupler in working position relative to the shank whereby the shank A is coupled to the shaft S for positive driving engagement. In FIG. 1 of the drawings I have illustrated a typical embodiment of the present invention showing the supporting shaft S that has positive driving engagement with the shank A through the coupler C that is held in working position by the pin D. The tooth point B is a replaceable element carried at the lower active terminal end of the shank A which end is adapted to swing when the shaft S is rotated.

The shaft S is an elongate bar like element that is provided to carry the shank A and may be considered to be horizontally disposed, as shown. The shaft S is adapted to drive or swing the shank A and is preferably polygonal in cross section, for example, rectangular or square and having like sides 10.

The shank A is an arm like element that is provided to carry a tooth point B and is adapted to be adjustably supported by the shaft S for driving connection therewith. The shank A is elongate having a flat front 11, a flat back 12, and flat sides 13. The front and back and the sides are parallel with each other, respectively, the shank A being rectangular in cross section with the sides 13 substantially closer together than the front and back 11 and 12. The shank A is preferably uniform in cross section throughout its length and is provided with a laterally projecting adapter 15 at its active terminal end. The front 11 of the shank A is adapted to have flat engagement with one of the sides 10 of the shaft S to the end that the shank A occurs adjacent one side of the shaft S, and as shown, extends along an axis offset from the axis of the shaft S and at a right angle thereto, to depend substantially vertically from the back side of the shaft S.

In accordance with the invention the shank connection involves a coupler positioning notch 16 and also a coupler locking notch 17. As shown, the notches 16 and 17 are provided in pairs and occur at substantially the same vertical position along the shank A, the positioning notch 16 being formed in the back 12, and the locking notch 17 being formed in the front 11 of the shank A. The notches 16 are arcuate or semi-circular recesses formed in the back 12 to cooperate with a positioning lug and to also cooperate with the pin D as hereinafter described. The notch 17 is a key shaped recess formed in the front 11 to cooperate with a lock lug as hereinafter described. The notch 17 has a flat bottom 18 and is characterized by a pitched seat 19.

The tooth point B is a removable element adapted to be secured to the adapter 15 above referred to, and involves a point 20 and a housing 21. The point 20 is a flat plate-like part sharpened at its forward end 22 and has a face 23 that has seating engagement with the top 24 of the adapter. The housing 21 is a U-shaped part with side sections 25 spaced to receive the adapter 15 and with a lower wall 26 that converges forwardly where it joins the point 20. Openings or recesses 27 are provided in opposite sides of the adapter 15 and the side sections 25 are depressed, as by hammering, into the recesses to retain the tooth point B in working position.

The coupler C is essentially a U-shaped element that extends around the front side of the shaft S and is provided to join the shank A to the shaft S by cooperatively engaging with the notches 16 and 17 in the shank. The coupler C involves, generally, a single body 30 having parallel upper and lower sections 31 and 32 joined by an intermediate section 33. The sections 31 and 32 are horizontally disposed and have faces 35 and 36 engageable with the upper and lower sides 10 of the shaft S. As shown, the sections 31 and 32 overlie both the shank A and shaft S and extend transversely of the shaft and are joined rigidly together at the forward side 10 of shaft S by the intermediate section 33. Said intermediate section 33 has a seat 37 normal to the faces 35 and 36 and which is engageable with the forward side 10 of the shaft.

The coupler C has positioning engagement with the shank A, and in accordance with the invention cooperatively engages with the positioning notch 16 provided at the back 12 of the shank. In the case illustrated the lower section 32 of the coupler C has an opening 40 extending therethrough in order to freely and slidably pass the shank A, the opening 40 being only slightly larger in cross section than the cross section of the shank A. In accordance with the invention a positioning lug 41 projects inwardly from the body 30 and into the notch 16 at the back 12 of the shank and engages in the notch. The lug 41 is arcuate or semi-circular in form to seat in the notch 16 and is adapted to rotate in the notch to the end that the body 30 of the coupler C will pivot relative to the shank A when the lug 41 is engaged in the notch 16. The back portion of the opening 40 is enlarged at 42, as shown, in order to allow for said pivotal movement.

The coupler C has locking engagement with the shank A and in accordance with the invention is cooperatively engaged with the locking notch 17 provided at the front 11 of the shank. In the case illustrated the upper section 31 of the coupler C is bifurcated and has a pair of spaced parallel cheeks 45 with opposed inner faces 46. The sides 13 of the shank A freely and slidably pass between the cheeks 45, the faces 46 being spaced only slightly more than the thickness of the shank A. The faces 46 are joined by the seat 37 that is in a vertical plane and which is adapted to be adjacent the front 11 of the shank. In accordance with the invention there is a lock lug 48 projecting from the body 30 at the front 11 of the shank and engaged in the notch 17. The lug 48 is key shaped in form to seat in the notch 17 and has a shoulder 49 adapted to bear against the pitched seat 19, above referred to.

It is a feature of the invention that the seat 19 and shoulder 49 are pitched to occur in a plane that is substantially normal to a radius line X—X drawn or projected from the center of the notch and lug 16 and 41. (See FIG. 3.) It will be observed that the coupler C pivots at the lug 41 in order to bring the lug 48 into and out of engagement with the notch 17, and with the shoulder 49, and seat 19 pitched as above described there is flat bearing engagement between said shoulder and said seat. Also observe that the arcuate lug 41 and notch 16 have uniform bearing engagement with each other at all times.

In carrying out the present invention, I provide a series of notches 16 and 17 in order to adjustably position the coupler C at different levels. As shown, there is a plurality of equally spaced notches 17 at the front 11 of the shank A and for each notch 17 there is a pair of spaced notches 16 at the back 12 of the shank. In FIG. 1 I have shown one notch 16 at the level of the notch 17 and one notch 16 substantially below the plane of the face 36. In practice, the said notches 16 are spaced apart a distance substantially equal to two diameters of the shaft S. Therefore, an even module of adjustment is obtained by spacing the notches 16 and 17 a distance equal to one diameter of the shaft S whereby any pair of notches 16 is engaged by the coupler C and pin D hereinafter described.

The pin D that is engaged with the coupler C and shank A is provided to secure the coupler in working position where the lugs 41 and 48 are engaged in the notches 16 and 17, respectively. The pin D is adapted to yieldingly hold the coupler C in said working position and is a flexible pin type construction that yieldingly urges the lug 48 of the coupler C into tight seating engagement with the notch 17 in the shank A. As shown, the pin D is round in cross sectional configuration and involves two like parallel parts 55 each of which is semi-circular in cross section, and a body of resilient material 56 such as rubber or the like. The parts 55 are diametrically opposite each other with the resilient material 56 therebetween so that the parts 55 are urged apart when the material 56 is under compression. In accordance with the invention aligned openings 57 are provided in the cheeks 45 to occur at the notch 16 opposite the notch 17. The openings 57 are somewhat offset and the end portions 60 of the pin D are tapered so that the pin can be easily driven into place and held in working position under compression. Further, the end portions 60 of the pin D are enlarged and define inwardly facing shoulders that center the pin D in working position. The pin parts 55 and resilient material 56 are rotatably oriented with the coupler C and shank A to be in a plane substantially parallel with the back 12. As shown, the forward portions 61 of the openings 57 are enlarged for clearance to the end that the pin D when it is compressed is urged against the back side of the openings 57 and against the shank A.

From the foregoing it will be readily seen that the tooth shank A is readily and easily adjusted and secured in the desired operative position to be supported by the shaft S. When it is desired to assemble the elements of the structure, it is merely necessary to engage the coupler C over the shaft S with the faces 35 and 36 in engagement with the upper and lower sides of the shaft. With the coupler in position the shank A is passed through the opening 40 and the desired notch 16 engaged with the lug 41, during which procedure the shank is slanted to clear the lug 48. With the shank A entered into the coupler C and engaged with the notch 16, the shank is pivoted or turned so that the front 11 lies parallel to and adjacent the back side of the shaft whereupon the lug 48 is engaged in the notch 17. At this point of assembly the pin D is driven into place through the openings 57 and yieldingly holds the lug 48 in the notch while the seat 37 has engagement with the front side 10 of the shaft S. It will be observed that the notches 16 and 17, by engaging the lugs 41 and 48, prevent spreading of the upper and lower sections 31 and 32 of the coupler body 30 to the end that the faces 35 and 36 have positive driving engagement with the shaft S.

Having described only a typical preferred form and application of my invention, I do not wish to be limited or restricted to the specific details herein set forth, but wish to reserve to myself any variations or modifications that may appear to those skilled in the art and fall within the scope of the following claims.

Having described my invention, I claim:

1. A connection of the character described including, a shaft, an elongate shank engaged with the shaft and extending laterally from opposite sides of the shaft, a notch in the side of the shank facing away from the shaft, a coupler having spaced sections engaged with opposite sides of the shaft, a lateral opening in one section and said shank engaged through said opening and said section bearing on the side of the shank facing away from the shaft, a lug formed on said one coupler section and projecting into the opening and engaged in said notch, and a pin carried by the other section and bearing on the said side of the shank facing away from the shaft and securing the coupler in position relative to the shank and the shank in position relative to the shaft.

2. A connection of the character described including, a shaft, an elongate shank engaged with the shaft and extending laterally from opposite sides of the shaft, spaced notches in the side of the shank facing away from the shaft, a coupler having spaced sections engaged with opposite sides of the shaft, a lateral opening in one section and said shank engaged through said opening and said section bearing on the side of the shank facing away from the shaft, a lug formed on said one coupler section and projecting into the opening and engaged in one of said notches, and a pin carried by the other section and bearing on the said side of the shank facing away from the shaft and engaged in another of said notches and securing the coupler in position relative to the shank and the shank in position relative to the shaft.

3. A connection of the character described including, a shaft, an elongate shank engaged with the shaft and extending laterally from opposite sides of the shaft, said shank having a front engaging the shaft and a back faced away from the shaft, a notch in the back of the shank and a notch in the front of the shank, a coupler having spaced sections engaged with opposite sides of the shaft, a lateral opening in one section and said shank engaged through said opening and said section bearing on the back of the shank, a positioning lug formed on said section and projecting into the opening and engaged in the notch in the back of the shank, a lock lug at and formed on the other section and engaged in the notch in the front of the shank, and a pin carried by the said other section and bearing on the back of the shank and securing the coupler in position relative to the shank and the shank in position relative to the shaft.

4. A connection of the character described including, a shaft, an elongate shank engaged with the shaft and extending laterally from opposite sides of the shaft, said shank having a front engaging the shaft and a back faced away from the shaft, spaced notches in the back of the shank and a notch in the front of the shank, a coupler having spaced sections engaged with opposite sides of the shaft, a lateral opening in one section and said shank engaged through said opening and said section bearing on the back of the shank, a positioning lug formed on said section and projecting into the opening and engaged in one of the notches in the back of the shank, a lock lug at and formed on the other section and engaged in the notch in the front of the shank, and a pin carried by the said other section and bearing on the back of the shank and engaged in another notch in the back of the shank securing the coupler in position relative to the shank and the shank in position relative to the shaft.

5. A connection of the character described including, a shaft, an elongate shank engaged with the shaft and extending laterally from opposite sides of the shaft, a notch in the side of the shank facing away from the shaft, a coupler having spaced sections engaged with opposite sides of the shaft, a lateral opening in one section and said shank engaged through said opening and said section bearing on the side of the shank facing away from the shaft, a lug formed on said coupler section and projecting into the opening and engaged in said notch, spaced cheeks formed on the other section and said shank engaged therebetween and a pin carried by and extending between the cheeks and bearing on the side of the shank facing away from the shaft and securing the coupler in position relative to the shank and the shank in position relative to the shaft.

6. A connection of the character described including, a shaft, an elongate shank engaged with the shaft and extending laterally from opposite sides of the shaft, spaced notches in the side of the shank facing away from the shaft, a coupler having spaced sections engaged with opposite sides of the shaft, a lateral opening in one section and said shank engaged through said opening and said section bearing on the side of the shank facing away from the shaft, a lug formed on said coupler section and projecting into the opening and engaged in one notch, spaced cheeks formed on the other section and said shank engaged therebetween, and a pin carried by and extending between the cheeks and bearing on the side of the shank facing away from the shaft and engaged in another notch securing the coupler in position relative to the shank and the shank in position relative to the shaft.

References Cited in the file of this patent

UNITED STATES PATENTS

| 1,629,548 | Spahn | May 24, 1927 |
| 2,716,822 | Launder et al. | Sept. 6, 1955 |

FOREIGN PATENTS

| 987,853 | France | Apr. 18, 1951 |
| 433,523 | Great Britain | Aug. 15, 1935 |